July 10, 1934.    G. E. STANLEY    1,966,146
CLUTCH WITHDRAWAL COLLAR
Filed Sept. 16, 1932
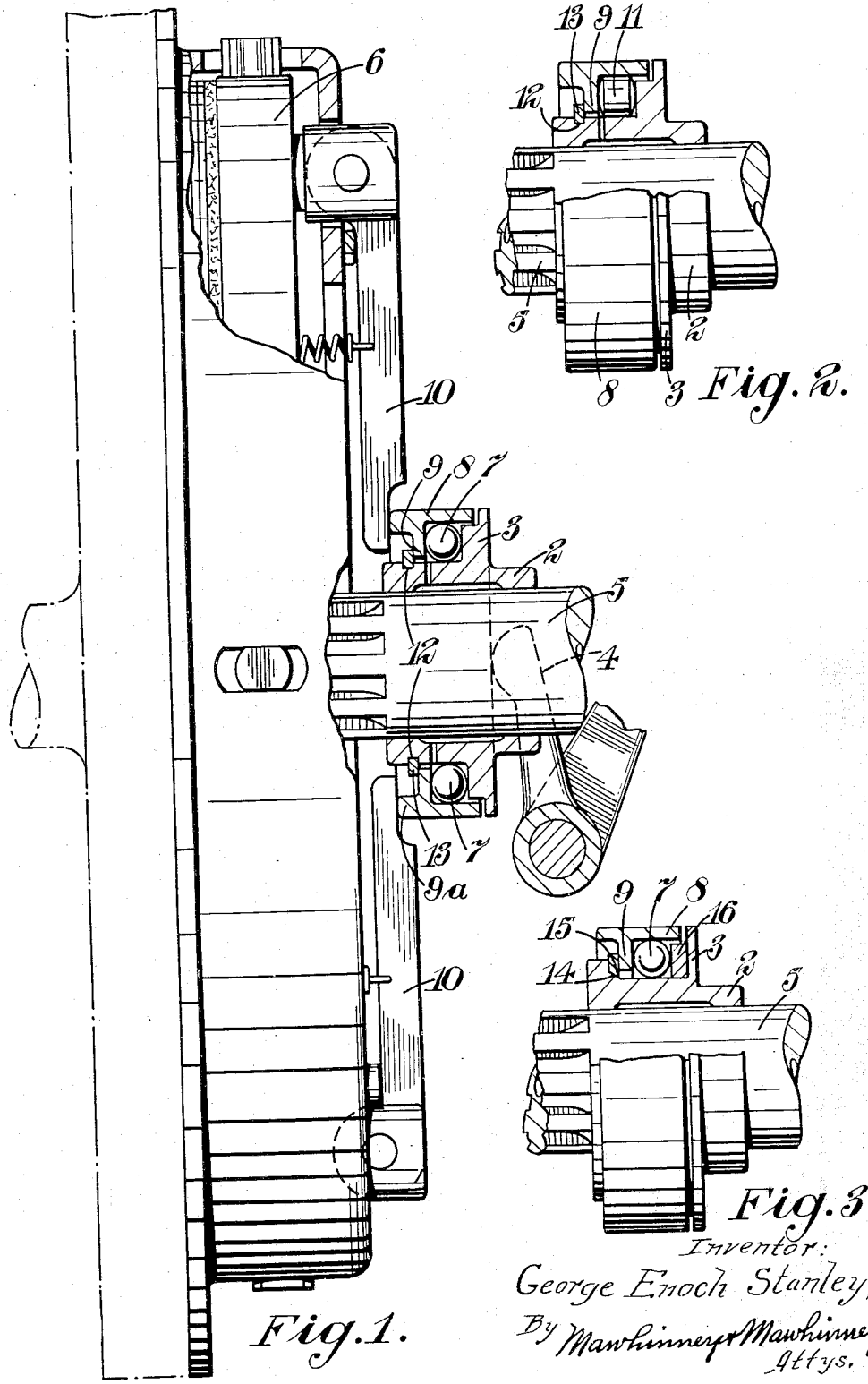

Patented July 10, 1934

1,966,146

UNITED STATES PATENT OFFICE 1,966,146

CLUTCH WITHDRAWAL COLLAR

George Enoch Stanley, Coventry, England, assignor to Roper & Wreaks Limited, Sheffield, England Application September 16, 1932, Serial No. 633,535
In Great Britain September 23, 1931

3 Claims. (Cl. 308—233)

This invention relates to collars for use in the withdrawal mechanism of clutches chiefly of the kind in which the presser plate is moved by radial levers. For example, most motor car clutches comprise inwardly-projecting radial levers the inner ends of which engage a collar slidable on a shaft under the influence of withdrawal mechanism of various forms.

Frequently these clutch collars carry ball races to prevent unnecessary friction between the collars and the levers, and to prevent wear.

The main object of the present invention is to provide a very efficient and inexpensive construction of withdrawal collar.

In the accompanying drawing,

Figure 1 is an elevation of a clutch with a withdrawal collar adapted according to the invention shown in section;

Figure 2 is a part-sectional elevation of a modified form of withdrawal collar; and Figure 3 is a view similar to Figure 2 and showing further modifications.

Like numerals indicate like parts throughout the drawing.

In the preferred construction, as shown in Figure 1, one member of the collar is a ring consisting of a sleeve 2 with an external radial flange 3. This flange is adapted to receive the clutch fork 4 or any other device which is employed to move the collar along the shaft 5 to withdraw the presser plate 6. In the angle formed by the radial face of the flange and the periphery of the ring is arranged a row of bearing balls 7, 7 which make contact with both these surfaces.

Mounted upon the bearing balls is the other ring comprising a sleeve 8 and an internal flange 9 which latter bears against the side of the balls whilst the sleeve portion 8 bears against the outer points of the balls, as shown in Figures 1 and 3, overlapping the whole ball race and preferably projecting over a short ledge on the flange 3.

The outer part of the sleeve 8 is thickened up at 9a and this part engages the ends of the clutch withdrawal levers 10, 10.

In the arrangement of Figure 2, spherical-ended rollers 11, 11 are mounted between the two rings, the axes of the rollers being disposed parallel to that of the shaft. In this case each ring has a point and a line contact with each roller.

Any suitable means may be employed for keeping the two rings in place. For example, as shown in Figures 1 and 2, a groove 12 is turned in the periphery of the sleeve 2 near the inner extremities of the levers and this receives a circular clip 13 of rectangular cross-section which is fitted after the parts are in place and projects sufficiently to prevent the ring 8, 9 coming out of position. The circular clip in Figure 3 is formed with an inclined inner edge 14 which coacts with a corresponding surface 15 on the sleeve portion 2 to thrust the outer ring 8, 9 towards the inner ring 2, 3 thus automatically to take up any wear.

The thrust surface of the ring 2, 3 may be a separate member, such as a hardened steel ring 16 (Figure 3) in which case the ring 2, 3 may be an aluminium, phosphor-bronze or equivalent light metal die-casting or the like which will therefore require no subsequent machining.

The complete clutch collar is therefore extremely inexpensive and is of small spinning weight.

What I claim as my invention and desire to secure by Letters Patent of the United States is:—

1. A thrust bearing including a pair of rings, rotary bearing members mounted between said rings, each of said members contacting at two spaced apart places with each ring, and means carried by one of said rings and co-operating with the other for retaining said rings in position, said means being adapted to continuously bias the rings towards one another against opposite faces of said rotary members.

2. A thrust bearing comprising a pair of rings, rotary bearing members mounted between said rings and having contact therewith, and means cooperating directly with said rings for urging the rings towards one another into contact with said bearing members whereby to automatically compensate for wear of the parts.

3. A thrust bearing comprising a pair of rings, rotary bearing members mounted between said rings and having contact therewith, one of said rings having a groove therein and the other ring having an inclined surface, a circular clip received by said groove and having an inclined inner edge coacting with the inclined surface of the other ring to urge the rings towards one another into contact with said bearing members to automatically compensate for wear of the parts.

GEORGE ENOCH STANLEY.